US008742296B2

(12) United States Patent
Bermudez

(10) Patent No.: US 8,742,296 B2
(45) Date of Patent: Jun. 3, 2014

(54) SELF-INFLATING HEAT SANITIZER

(75) Inventor: Joseph Anthony Bermudez, Oakland, CA (US)

(73) Assignee: Joseph Anthony Bermudez, Oakland, CA (US)

( * ) Notice: Subject to any disclaimer, the term of this patent is extended or adjusted under 35 U.S.C. 154(b) by 429 days.

(21) Appl. No.: 13/282,364

(22) Filed: Oct. 26, 2011

(65) Prior Publication Data

US 2012/0285944 A1 Nov. 15, 2012

Related U.S. Application Data

(60) Provisional application No. 61/484,764, filed on May 11, 2011.

(51) Int. Cl.
*E04H 15/00* (2006.01)
*A01M 1/20* (2006.01)

(52) U.S. Cl.
USPC ............ 219/385; 43/132.1; 165/46; 219/200; 219/386; 219/391

(58) Field of Classification Search
USPC ........................... 219/385, 387; 392/360–385
See application file for complete search history.

(56) References Cited

U.S. PATENT DOCUMENTS 3,255,751 A * 6/1966 Bouet ...................... 128/205.26
3,419,915 A * 1/1969 Clark, Jr. .......................... 4/526
3,503,167 A * 3/1970 Mackie ........................ 52/309.6
3,710,791 A * 1/1973 Deaton .................... 128/205.26
3,766,844 A * 10/1973 Donnelly et al. ............. 454/238
4,044,772 A * 8/1977 Schloss ........................... 607/87
4,099,338 A * 7/1978 Mullin et al. ................... 34/514
4,121,353 A * 10/1978 Baumgartner et al. ........... 34/99
4,210,073 A * 7/1980 Weiss ............................. 99/483
4,572,188 A * 2/1986 Augustine et al. ............ 607/107
4,961,271 A * 10/1990 Butler ............................... 34/60
5,095,559 A * 3/1992 Liljegren et al. ............... 4/541.2
5,216,948 A * 6/1993 Sheppard et al. ............... 99/483
5,526,802 A * 6/1996 Riezenman ................... 126/246
6,051,266 A * 4/2000 Totsuka ........................ 426/466
6,061,969 A * 5/2000 Leary ............................ 52/2.11
6,945,064 B2 * 9/2005 Jebaraj ......................... 62/259.1
7,189,349 B2 * 3/2007 Karle .............................. 422/28
7,612,735 B2 * 11/2009 Essig et al. .................... 343/915
7,837,932 B2 * 11/2010 Hedman .......................... 422/22
7,938,283 B2 * 5/2011 Villers et al. ................... 220/1.5
2002/0042640 A1 * 4/2002 Augustine et al. ............ 607/107
2002/0121101 A1 * 9/2002 Jebaraj ......................... 62/259.1
2002/0139408 A1 * 10/2002 Mitzner ........................ 135/115
2003/0133834 A1 * 7/2003 Karle .............................. 422/33
2004/0004993 A1 * 1/2004 Cho et al. ...................... 374/163

(Continued)

*Primary Examiner* — Henry Yuen
*Assistant Examiner* — Lawrence Samuels

(57) ABSTRACT

The present invention is a self-inflating heat sanitizer, which uses convective heat transfer to eradicate bed bugs within an item. The heater unit propagates and reheats the air within the present invention as the heated air flows through the present invention. The heat chamber enclosure is a compartment that allows the heated air to circulate around the item and raise the temperature of the item to above 140° F. The structure of the heat chamber enclosure is inflatable walls, which are pressurized when the heated air flows into the heat chamber enclosure. The heated air will then vent out of the inflatable walls into the treatment volume, where the item is located. The insulated ducts lead the heated air from the heater unit into the inflatable walls and lead the heated air from the treatment volume back to the heater unit.

7 Claims, 3 Drawing Sheets

(56) References Cited

U.S. PATENT DOCUMENTS

| | | | | |
|---|---|---|---|---|
| 2005/0246942 | A1* | 11/2005 | Mueller et al. | 43/124 |
| 2006/0033674 | A1* | 2/2006 | Essig et al. | 343/912 |
| 2007/0084105 | A1* | 4/2007 | Lindsay et al. | 43/129 |
| 2008/0014111 | A1* | 1/2008 | Hedman | 422/3 |
| 2011/0064605 | A1* | 3/2011 | Hedman | 422/3 |
| 2012/0186138 | A1* | 7/2012 | Bell et al. | 43/125 |
| 2012/0186140 | A1* | 7/2012 | Raud et al. | 43/132.1 |
| 2012/0233907 | A1* | 9/2012 | Pattison et al. | 43/124 |

* cited by examiner

SELF-INFLATING HEAT SANITIZER

The current application claims a priority to the U.S. Provisional Patent application Ser. No. 61/484,764 filed on May 11, 2011.

FIELD OF THE INVENTION

The present invention generally relates to a sanitation device, which eradicates bed bugs by heating the surrounding area.

BACKGROUND OF THE INVENTION

The bed bug epidemic constitutes a growing worldwide problem which affects hotels, dormitories, and many other communal settings. Travel, which involves a hotel stay, currently presents a significant risk of a bed bug encounter (0.6-24.4% hotel rooms required treatment for bedbugs according to the survey involving 700 client hotels of the pest-control company Steritech—reference: USA Today "Bedbugs take a bite out of travel comfort" Sep. 15, 2006). Bed bugs occur in any type of hotel from the most economical to the very upscale. Nearly every major well-known hotel chain suffers from mild to severe bed bug encounters by patrons and several of these adverse experiences have resulted in multimillion dollar lawsuits with damaging publicity.

Despite the disgusting and traumatic episodes incurred by bed bug sightings and bed bug bites, the substantially worse outcome remains the common inadvertent transmission of bed bugs back to the traveler's home since the bed bug eggs and nymphs easily attach to luggage and clothing items. Reliance upon the hotel to ensure the absence of bed bugs or even adequate bed bug prevention constitutes mere unrealizable fantasy in the current era of cost cuts and production pressure. Bed bug transmission to the home quickly results in a maddening infestation problem quite resistant to resolution. Bed bugs are prolific and resilient insects which defy simple insecticide eradication methods—thus, requiring fairly toxic intensive pesticides with commercial professional application. Infestations rapidly spread to beds, carpets, furniture, baseboards, and even interior house walls. Fortunately, bed bugs are quite sensitive to heat extermination with well-known lethal temperature of 140 degrees Fahrenheit (60 degrees Celsius) for all life stages (eggs/nymphs/adults). Once a bed bug infestation has become established, the homeowner has little choice but to pursue the costly and inconvenient options of partial room heat treatment, whole room heat treatment, whole house heat treatment, intensive localized insecticide treatment, and/or whole house intensive insecticide treatment. All these options are fraught with huge expense (several or many thousands of dollars depending upon luck and infestation severity). Furthermore, the partial house treatment options never guarantee success since the tiniest survival quotient will cause a relapse of the infestation. Finally, none of these options prevent later infestation from a new source of travel.

A secure method of prevention regarding the problem of bed bug transmission to the home would require heat treatment of the traveler's luggage and clothing prior to entering the house. Furthermore, the usual situation involving a fatigued traveler demands that any disinfection procedure be nearly effortless in order to ensure compliance and success with the method. The present invention offers that convenient and nearly effortless solution to the bed bug risk by allowing quick heat sanitation on the porch or in the garage prior to home entry. Operation of the present invention requires only that the power unit hose be connected to the self-deploying heat treatment chamber and the device be activated. The heat treatment chamber then self-inflates, allowing luggage placement. A fabric flap door is secured and the heat treatment proceeds automatically. The operational simplicity and verifiable effectiveness of the present invention ensures success and peace of mind after any form of travel.

DETAIL DESCRIPTIONS OF THE INVENTION

Figure 1:
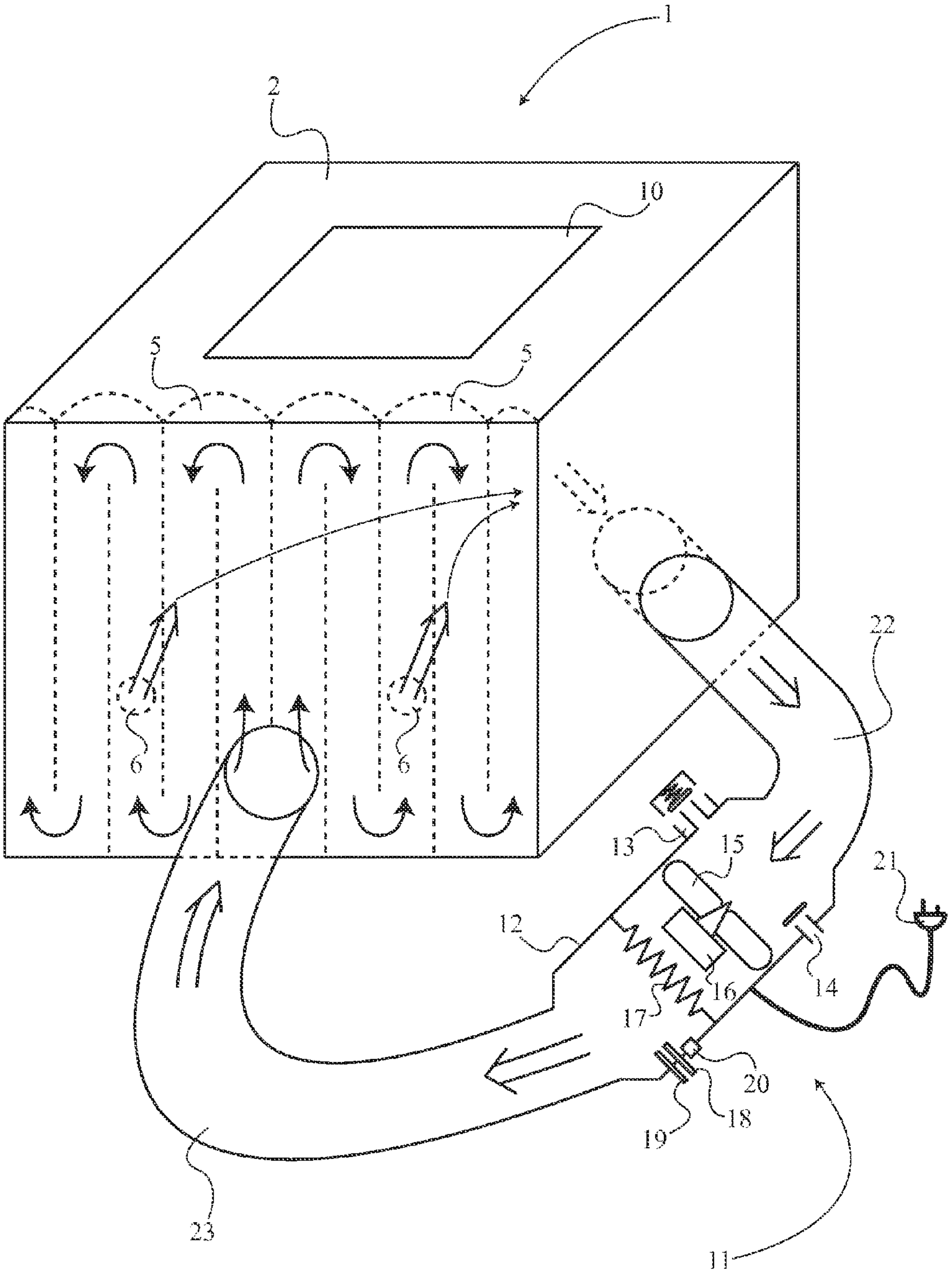
FIG. 1 is an operational view of the present invention.
Figure 2:
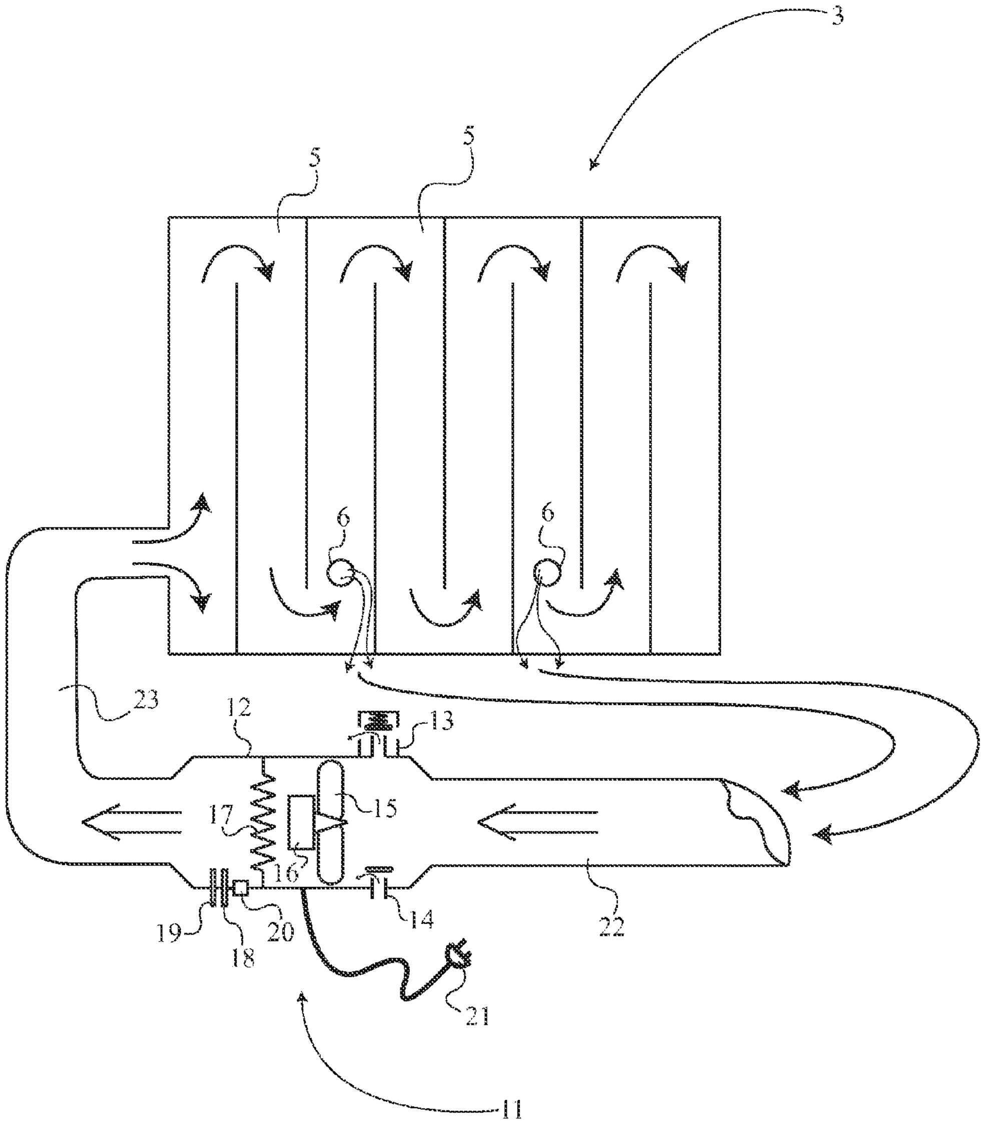
FIG. 2 is an operational view of the present invention highlighting the inner workings of one side of the inflatable wall.
Figure 3:
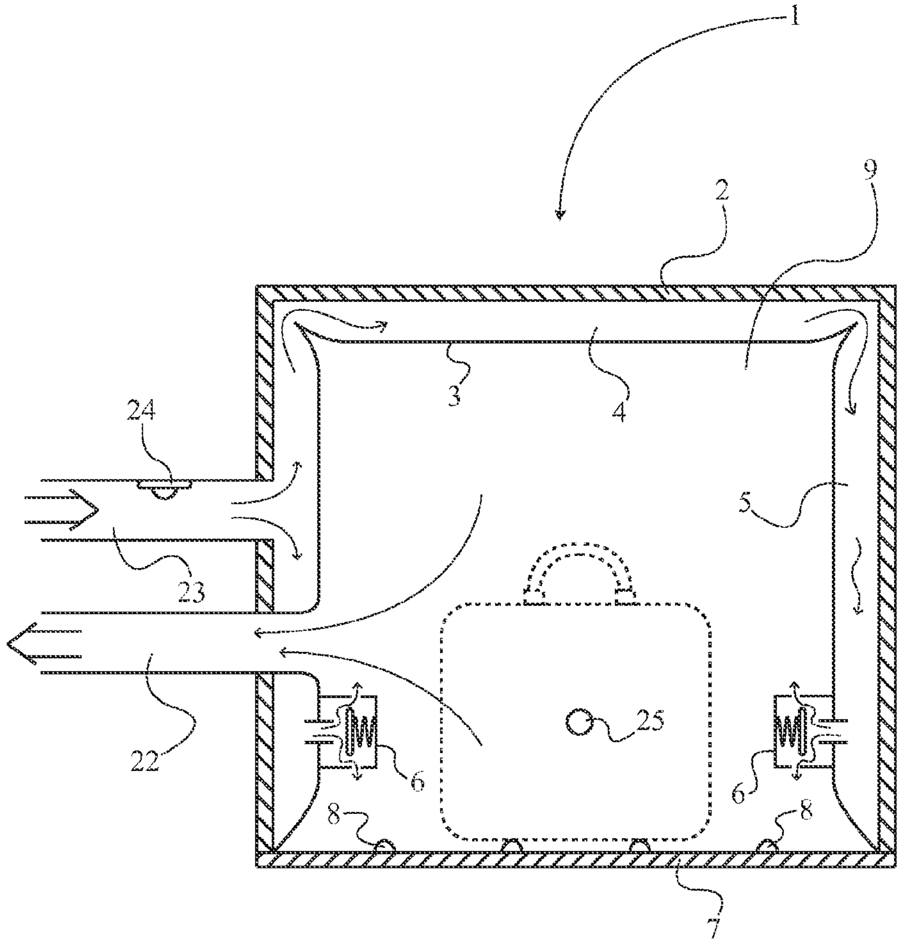
FIG. 3 is an operational view of a cross section of the heat chamber enclosure.

All illustrations of the drawings are for the purpose of describing selected versions of the present invention and are not intended to limit the scope of the present invention.

The present invention is a self-inflating heat sanitizer, which allows a user to efficiently heat a piece of luggage to above 140° F. in order to kill bed bugs at all stages of life (eggs/nymph/adults). The present invention raises the temperature of the piece of luggage through convective heat transfer. The present invention is designed to kill bed bugs within a piece of luggage because luggage is typically how bed bugs enter a home, but the present invention can be used to kill beg bugs within any kind of item. The self-inflating heat sanitizer comprises a heat chamber enclosure 1, a chamber entrance 10, a heater unit 11, a temperature controller computer 20, a power source 21, a return insulated duct 22, an entry insulated duct 23, a carbon monoxide monitor 24, and a core temperature monitor 25. The heat chamber enclosure 1 is the compartment where the piece of luggage is heated by the present invention. The chamber entrance 10 provides the user with a sealable opening that allows the user to place the piece of luggage within the heat chamber enclosure 1. The heater unit 11 constantly reheats and circulates the air that is surrounding the piece of luggage. The return insulated duct 22 allows the surrounding air to enter the heater unit 11, and the entry insulated duct 23 allows the surrounding air to reenter the heat chamber enclosure 1. The power source 21 provides the electrical components of the present invention with the necessary power to function. The carbon monoxide monitor 24 notifies the user of the carbon monoxide level of the surrounding air and provides the user with an early combustion or imminent fire warning. The core temperature monitor 25 is inserted into the center of the piece of luggage as a means to observe the internal temperature of the piece of luggage. The temperature controller computer 20 moderates the temperature of the surrounding air by increasing or decreasing the heat that is applied by the heater unit 11.

The heat chamber enclosure 1 allows the present invention to circulate hot air around the piece of luggage in order to raise the temperature of the piece of luggage. The heat chamber enclosure 1 is largest component of the present invention and is completely collapsible, which allows the user to easily store the present invention. The heat chamber enclosure 1 comprises an insulation wall 2, an inflatable wall 3, a plurality of vents 6, a bottom wall 7, and a treatment volume 9. The inflatable wall 3 is filled with hot air by the heater unit 11 and provides the structure for the heat chamber enclosure 1. The inflatable wall 3 consists of a plurality of top ribs 4 and a plurality of lateral ribs 5. The plurality of top ribs 4 is pressurized by heated air in order to form the top portion of the inflatable wall 3, and the plurality of lateral ribs 5 is pressurized by heated air in order to form the lateral portion of the inflatable wall 3. The plurality of top ribs 4 and the plurality of lateral ribs 5 are also interconnected to each other so that each of the plurality of top ribs 4 and each of the plurality of lateral ribs 5 are evenly pressurized by the heated air. The plurality of top ribs 4 and the plurality of lateral ribs 5 can be depressurized by turning off the heater unit 11, which allows the heat chamber enclosure 1 to be completely collapsible. In a different embodiment of the present invention, the heat chamber enclosure 1 would also include a plurality of loops and a system of tent poles. The plurality of loops and the system of tent poles are positioned and attached to the heat chamber enclosure 1 in such a way that the plurality of loops and the system of tent poles further support the structure provided by the inflatable wall 3.

The position of the other components of the heat chamber enclosure 1 is defined by the inflatable wall 3. The insulation wall 2 is layered onto the inflatable wall 3 as the outer wall of the heat chamber enclosure 12. While the inflatable wall 3 does prevent some of the heat loss from the heat chamber enclosure 1, the insulation wall 2 greatly reduces the heat loss and significantly increases the overall heating efficiency of the present invention. In the preferred embodiment of the present invention, the insulation wall 2 is one or two sheets of Mylar that are flaccidly sewn onto the inflatable wall 3 and are stretched out when the inflatable wall 1 is filled with heated air. The bottom wall 7 is connected below to the inflatable wall 1 and the insulation wall 2. Once the user places the piece of luggage into the heat chamber enclosure 1, the bottom wall 7 supports the piece of luggage with a plurality of hard nubs 8, which are positioned perpendicular to the bottom wall 7. The plurality of hard nubs 8 allows the piece of luggage to be situated with some clearance in between the piece of luggage and the bottom wall 7, which allows the heated air within the treatment volume 9 to flow underneath the piece of luggage. The treatment volume 9 is the space within the heat chamber enclosure 1 that circulates the heated air around the piece of luggage. The treatment volume 9 is shaped by the inflatable wall 3 and the bottom wall 7. In the preferred embodiment of present invention, the pressure of the treatment volume 9 should be slightly greater than or equal to one atmosphere but significantly less than 1.2 atmospheres. The plurality of vents 6 fills the treatment volume 9 with the heated air that is flowing through the inflatable wall 3. The plurality of vents 6 is positioned to traverse from the plurality of lateral ribs 5 into the treatment volume 9. Also in the preferred embodiment of the present invention, the plurality of vents 6 is spring-loaded disc poppet valves, which are set to maintain a pressure of approximately 1.2 atmospheres within the inflatable wall 3.

The heater unit 11 provides the means to heat the piece of luggage with convective heat transfer by propagating the heated air through the heat chamber enclosure 1 and keeping the heated air to a temperature above 140° F. The heater unit 11 comprises a casing 12, a relief valve 13, a make-up valve 14, a ducted fan 15, a motor 16, a resistance heater 17, an ideal temperature control 18, and an overheat temperature control 19. The casing 12 is a rigid insulated tube, which allows the other components of the heater unit 11 to manage the hot air flowing through the present invention. The casing 12 also provides a base for the other components of the heater unit 11 to be attached together. The casing 12 is attached to the entry insulated duct 23 on one end and is attached to the return insulated duct 22 on the other end. In the preferred embodiment of the present invention, the temperature of the hot air flowing into the casing 12 is approximately 120° F., and the temperature of the hot air flowing out of the casing 12 is approximately 160° F. The ducted fan 15 physically propagates the flow of the hot air through the casing 12 and, thus, through the present invention. The ducted fan 15 is sized to be encircled by and attached to the casing 12 in between the entry insulated duct 23 and the return insulated duct 22. The ducted fan 15 is engaged by the motor 16, which converts the electrical energy that is provided by the power source 21 into the mechanical energy required by the ducted fan 15 to operate. The resistance heater 17 is attached within the casing 12 in between the ducted fan 15 and the entry insulated duct 23. The resistance heater 17 converts the electrical energy that is provided by the power source 21 into thermal energy, which reheats the air flowing through the casing 12.

The present invention uses the temperature controller computer 20, the ideal temperature control 18, and the overheat temperature control 19 to regulate the temperature of the air flowing out of the casing 12 and into the entry insulated duct 23. The ideal temperature control 18 and the overheat temperature control 19 are positioned in between the resistance heater 17 and the entry insulated duct 23, which allow the ideal temperature control 18 and the overheat temperature control 19 to monitor the temperature of the air flowing out of the casing 12. The ideal temperature control 18 and the overheat temperature control 19 are positioned to traverse into the casing 12. The ideal temperature control 18 and the overheat temperature control 19 are electronically connected to the temperature controller computer 20, which is electronically connected to the resistance heater 17. The ideal temperature control 18 is a sensor that determines if the temperature of the air flowing out of the casing 12 is higher or lower than the ideal temperature. Once the ideal temperature control 18 senses a deviation from the ideal temperature in the air flowing out of the casing 12, the temperature controller computer 20 increases or decreases the thermal energy output of the resistance heater 17 depending on the sensor reading made by the ideal temperature control 18. The overheat temperature control 19 is a sensor that determines if the temperature of the air flowing out of the casing 12 is higher than the overheat temperature. Once the overheat temperature control 19 makes a temperature reading higher than the overheat temperature from the air flowing out of the casing 12, the temperature controller computer 20 shuts down the resistance heater 17 because the temperature of the air flowing out the casing 12 is dangerously high. In the preferred embodiment of the present invention, the ideal temperature control 18 and the overheat temperature control 19 can be either thermistors or thermocouples.

In addition, the present invention uses the make-up valve 14 and the relief valve 13 to regulate the pressure of the air flowing into the casing 12 from the return insulated duct 22. The make-up valve 14 and the relief valve 13 are positioned in between the ducted fan 15 and the return insulated duct 22. The make-up valve 14 and the relief valve 13 are positioned to traverse into the casing 12. The make-up valve 14 allows air from outside of the present invention to enter the casing 12 when the pressure within the casing 12 becomes too low. The relief valve 13 releases air out of the casing 12 when the pressure within the casing 12 becomes too high. In the preferred embodiment of the present invention, the make-up valve 14 allows the air to enter the casing 12 if the pressure within the casing 12 is less than one atmosphere, and the relief valve 13 allows the air to escape the casing 12 if the pressure within the casing 12 is greater than 1.2 atmospheres.

The present invention uses a process in order to kill bed bugs within a piece luggage with convective heat transfer. The process begins by propagating the air with the ducted fan 15 through the resistance heater 17 in order to raise the temperature of the air above 140° F. The heated air then flows through the entry insulated duct 23 into the inflatable wall 3 because the entry insulated duct 23 is positioned to traverse into the insulated wall. Consequently, the inflatable wall 3 is pressurized by the heated air and, thus, becomes inflated. When the pressure of the heated air within the inflatable wall 3 reaches a maximum pressure limit, the plurality of vents 6 releases the heated air into the treatment volume 9. The heated air can then flow from the treatment volume 9 into return entry duct because the return entry duct is positioned to traverse out of the treatment volume 9. Thus, the piece of luggage within the treatment volume 9 will experience convective heat transfer as the heated air flows out of the plurality of vents 6, through the treatment volume 9, and out of the return insulated duct 22. The return insulated duct 22 will guide the heated air back to the heater unit 11, which will adjust the pressure of the heated air with the make-up valve 14 and the relief valve 13. Finally, the process is restarted as the heated air cycles through the present invention.

The electrical components of the present invention are all electrically connected to the power source 21 as a means to obtain electrical energy. In the preferred embodiment of the present invention, the power source 21 would be an electrical cord and plug that are attached to a standard outlet. The electrical components include the motor 16, the resistance heater 17, the ideal temperature control 18, the overheat temperature control 19, the temperature controller computer 20, the carbon monoxide monitor 24, and the core temperature monitor 25. Most of the electrical components are located within the heater unit 11, but the carbon monoxide monitor 24 and the core temperature monitor 25 are not located within the heater unit 11. The carbon monoxide monitor 24 is positioned to traverse into the entry insulated duct 23 adjacent to the inflatable wall 3. The core temperature monitor 25 is usually placed within the contents of the piece of luggage in order to retrieve the best possible internal temperature reading, and, thus, the core temperature monitor 25 is located within the treatment volume 9.

Although the invention has been explained in relation to its preferred embodiment, it is to be understood that many other possible modifications and variations can be made without departing from the spirit and scope of the invention as hereinafter claimed.

What is claimed is:

1. A self-inflating heat sanitizer comprises,
a heat chamber enclosure;
a chamber entrance;
a heater unit;
a temperature controller computer;
a power source;
a return insulated duct;
an entry insulated duct;
a carbon monoxide monitor;
a core temperature monitor;
said heat chamber enclosure comprises an insulation wall, an inflatable wall, a plurality of vents, a bottom wall, and a treatment volume;
said heater unit comprises a casing, a relief valve, a make-up valve, a ducted fan, a motor, a resistance heater, an ideal temperature control, and an overheat temperature control;
said inflatable wall comprises a plurality of inflatable top ribs and a plurality of inflatable lateral ribs;
said bottom wall comprises a plurality of hard nubs;
said insulation wall being layered onto said inflatable wall;
said bottom wall being connected below to said insulation wall and to said inflatable wall;
said treatment volume being located within said inflatable wall;
said treatment volume being delineated by said inflatable wall and said bottom wall;
said plurality of inflatable top ribs being positioned atop said plurality of inflatable lateral ribs;
said plurality of inflatable top ribs and said plurality of inflatable lateral ribs being interconnected with each other;
said plurality of vents traversing from said plurality of inflatable lateral ribs into said treatment volume;
said plurality of vents comprising a valve for maintaining a non-atmospheric pressure within said inflatable wall;
said treatment volume being traversed into by said return insulated duct;
said heater unit being attached to said return insulated duct opposite of said treatment volume;
said inflatable wall being traversed into by said entry insulated duct; and
said heater unit being attached to said entry insulated duct opposite of said inflatable wall.

2. The self-inflating heat sanitizer as claimed in claim 1 further comprises,
said return insulated duct being attached to said casing;
said entry insulated duct being attached to said casing opposite of said return insulated duct;
said ducted fan being encircled and attached to said casing;
said ducted fan being positioned in between said return insulated duct and said entry insulated duct within said casing; and
said motor being engaged to said ducted fan.

3. The self-inflating heat sanitizer as claimed in claim 2 comprises,
said resistance heater being positioned in between said ducted fan and said entry insulated duct;
said resistance heater being attached to said casing;
said ideal temperature control and said overheat temperature control being positioned in between said resistance heater and said entry insulated duct;
said ideal temperature control traversing into said casing; and
said overheat temperature control traversing into said casing.

4. The self-inflating heat sanitizer as claimed in claim 2 comprises,
said make-up valve and said relief valve being positioned in between said ducted fan and said return insulated duct;
said make-up valve traversing into said casing; and
said relief valve traversing into said casing.

5. The self-inflating heat sanitizer as claimed in claim 1 further comprises,
said plurality of hard nubs being connected to said bottom wall and protruding into said treatment volume.

6. The self-inflating heat sanitizer as claimed in claim 1 further comprises,
said carbon monoxide monitor traversing into said entry insulated duct; and
said core temperature monitor being located within said treatment volume.

7. The self-inflating heat sanitizer as claimed in claim 1 further comprises, said motor, said resistance heater, said ideal temperature control, said overheat temperature control, said carbon monoxide monitor, said core temperature monitor, and said temperature controller computer being electrically connected to said power source; and said ideal temperature control and said overheat temperature control being electronically connected to said resistance heater through said temperature controller computer.

* * * * *